Patented Nov. 30, 1926.

1,609,084

UNITED STATES PATENT OFFICE.

FRIEDRICH FUNCKE, OF FRANKFORT-ON-THE-MAIN, GERMANY, ASSIGNOR TO I. G. FARBENINDUSTRIE AKTIENGESELLSCHAFT, OF FRANKFORT, GERMANY.

VAT DYESTUFFS OF THE ANTHRAQUINONE SERIES AND PROCESS OF MAKING SAME.

No Drawing. Application filed September 17, 1925, Serial No. 57,032, and in Germany September 27, 1924.

My invention relates to new vat dyestuffs of the anthraquinone series, which may be obtained by condensing aryl-ketodihydro-para-thiazins, which are dihalogenated in the methylene group, having probably the general formula:

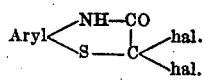

with aryl-ortho-diamins, at least one of the reacting components being a derivative of anthraquinone.

Especially valuable dyestuffs are obtained by condensing anthraquinonyl-ketodihydro-para-thiazins, which are dihalogenated in the methylene group, having probably the general formula:

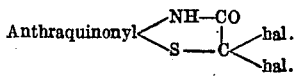

with anthraquinonyl-ortho-diamins and by subsequently alkylating the products of condensation.

The new dyestuffs are, when dry, yellow, brown to greenish powders, soluble in sulfuric acid to a yellow to red solution, poorly soluble in the usual organic solvents, soluble in alkaline hydrosulfite solutions to yellow, blue to green solutions, and dye cotton in yellow to brown shades.

The products obtained by condensing ortho-diamins, not substituted at the N-atom, are not fast to alkali but they can be transformed by treating with the usual alkylating or arylating agents into compounds, fast to alkali, having probably the same constitution as the bodies formed by directly using the corresponding ortho diamins, substituted at the N-atom.

The condensation may be easily conducted in higher boiling solvents with or without addition of a condensing agent, absorbing water or acids, such as acetate of soda and so on.

The constitution of the bodies has not been ascertained definitely, but it is to be presumed that a new nucleus is formed by separation of hydrohalogen acid and water or only of hydrohalogen acid.

The following examples illustrate the invention, the parts being by weight and all temperatures in centigrade.

*Example 1.*

7.5 parts of anthraquinonyl-dichloro-keto-dihydro-2,1-thiazin and 4.5 parts of ortho-phenylenediamin are stirred together in 70 parts of dichlorobenzene for 2–3 hours at 125–130° C. The product of condensation is filtered off, when cold, washed with dichlorobenzene, alcohol and hot water. It forms when dry a brown powder, the melting point of which is above 300°, which can be easily dissolved in the hydrosulfite vat and dyes from a brown solution cotton in brown shades.

The reaction occurring in the case of this example may be represented by the following equation:

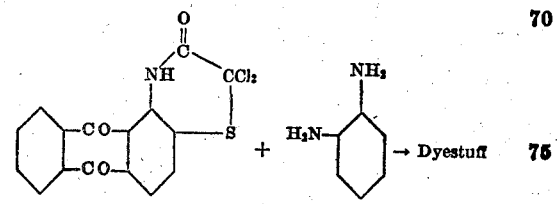

*Example 2.*

9.4 parts of anthraquinonyl-dichloroketo-dihydro-2,1-thiazin are stirred together with 3.6 parts of 4,5-diamino-1, 3-xylene, 5 parts of dehydrated sodium acetate and 50 parts of nitrobenzene for 3–4 hours at 140–150°. The dark brown product of reaction forms a greenish solution with the hydrosulfite vat, from which cotton is dyed in dark brown shades.

The reaction occurring in the case of this example may be represented by the following equation:

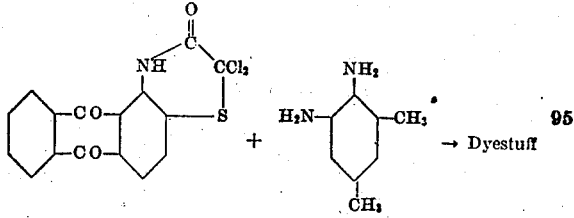

*Example 3.*

11 parts of 1-amino-2-toluido-anthraquinone (prepared from 1-amino-2-bromo-anthraquinone and paratoluidin) are heated together with 12.5 parts of anthraquinonyl-dichloroketodihydro-2,1-thiazin and 50 parts of nitrobenzene for 3–4 hours at 150°. The greenish product of reaction which is very poorly soluble, is filtered off and washed with nitrobenzene and alcohol. Treated with a solution of hypochlorite, the dyestuff, in a green solution, made with the hydrosulfite vat, will dye cotton in strong greenish yellow shades of an excellent fastness.

The reaction occurring in the case of this example may be represented by the following equation:

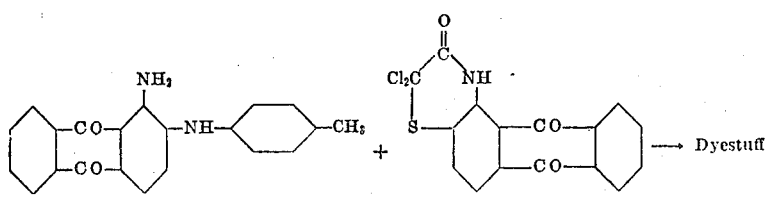

Example 4.

6.2 parts of para-tolylketo-dichlorodihydro-para-thiazin are heated with 5.9 parts of 1,2-diaminoanthraquinone with or without addition of a condensing agent such as sodium acetate in 70 parts of nitrobenzene for 2–3 hours at 150°. After expelling the nitrobenzene a brown product of reaction is obtained, which can be crystallized in organic solvents having high boiling points. The dyestuff, thus obtained and purified with a solution of hypochlorite, and made into a claret red solution with the hydrosulfite vat, will dye cotton in yellow shades.

The reaction occurring in the case of this example may be represented by the following equation:

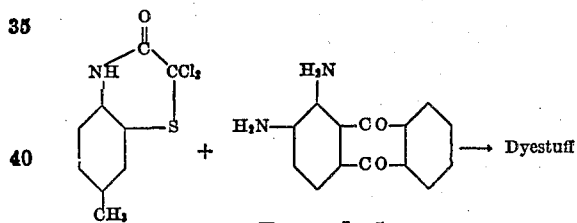

Example 5.

7.5 parts of anthraquinonyl-dichloroketodihydro-1,2-thiazin of the formula:

and 4.8 parts 1,2-diaminoanthraquinone of the formula:

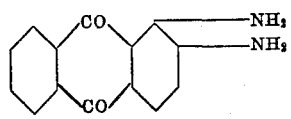

are stirred in 80 parts of nitrobenzene with 3.5 parts of dehydrated sodium acetate for 2–3 hours at 140–150°. After expelling the nitrobenzene by steam the yellowish brown product of reaction melting over 300° may be purified by crystallizing in organic solvents having high boiling points, or by treating with a dilute solution of hypochlorite.

For preparing it in a very pure condition it is especially advantageous to melt the product together with 5–10 parts of the ethyl ester of toluene sulfonic acid for several hours at 140–150°. In this manner a dyestuff is obtained, dyeing cotton from a blue solution, made with the hydrosulfite vat, in bright yellow shades.

4 parts of the product of reaction are mixed with 30 parts of the ethyl ester of toluene sulfonic acid and stirred for 7 hours at 200°. The mass is then diluted with alcohol and the dyestuff, which is filtered off and well washed, is purified with a solution of hypochlorite. The ethylated product may also be isolated by pouring the mass into 5–10 parts of surfuric acid, then heating for a short time to 100–110° and pouring the mixture into water. Treated with a solution of hypochlorite, the mass will yield a yellow vat dyestuff of an excellent quality, dyeing cotton in yellow shades, fast to alkali.

In an analogous manner the methyl ester of toluene sulfonic acid and other alkylating agents may be used.

Now, what I claim, is:

1. As new compounds vat dyestuffs of the anthraquinone series, which are products of condensing dihalogenated arylketodihydro-para-thiazins and aryl-ortho-diamins at least one of the reacting components being a derivative of anthraquinone, which dyestuffs are when dry yellow, brown to yellowish powders, soluble in sulfuric acid to a yellow to red solution poorly soluble in the usual organic solvents, soluble in alkaline hydrosulfite solutions to a yellow, blue to green solution, and dye cotton in yellow to brown shades.

2. A process of making new vat dyestuffs of the anthraquinone series consisting in condensing aryl-ketodihydro-para-thiazins, which are dihalogenated in the methylene group, having probably the general formula:

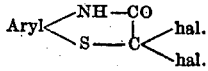

with aryl-ortho-diamins, at least one of the reacting components being a derivative of anthraquinone.

3. As new compounds vat dyestuffs of the anthraquinone series, which are products of condensing dihalogenated anthraquinonyl-ketodihydro-para-thiazins and anthraquinonyl-ortho-diamins and of subsequently alkylating, which dyestuffs are when dry yellow, brown to yellowish powders, soluble in sulfuric acid to a yellow to red solution poorly soluble in the usual organic solvents, soluble in alkaline hydrosulfite solutions to a yellow, blue to green solution, and dye cotton in yellow to brown shades.

4. A process of making new vat dyestuffs of the anthraquinone series consisting in condensing anthraquinonyl - ketodihydro-para-thiazins, which are dihalogenated in the methylene group, having probably the general formula:

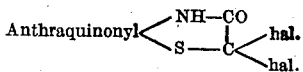

with anthraquinonyl-ortho-diamins and in alkylating subsequently the products of condensation.

5. As a new compound a vat dyestuff of the anthraquinone series, which is a product of condensing anthraquinonyl-dichloroketo-dihydro-1,2-thiazin and 1,2-diamino-anthraquinone and of subsequent ethylation, which is, when dry, a yellow powder, soluble in sulfuric acid to a yellow solution poorly soluble in the usual organic solvents, soluble in alkaline hydrosulfite solutions to a green solution and dyes in yellow shades, fast to alkali.

6. A process of making a new vat dyestuff of the anthraquinone series consisting in condensing anthraquinonyl-dichloroketo-dihydro-1,2-thiazin of the formula:

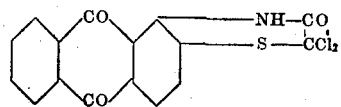

with 1,2-diaminoanthraquinone of the formula:

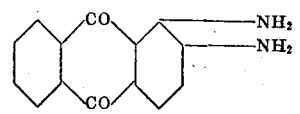

and in treating the product of condensation with an ethylating agent.

In testimony, that I claim the foregoing as my invention, I have signed my name, this 4th day of Sept., 1925.

Dr. FRIEDRICH FUNCKE.